(12) United States Patent
Tenorio (10) Patent No.: US 7,853,505 B2
(45) Date of Patent: Dec. 14, 2010

(54) DISPLAYING MARKET DATA

(75) Inventor: Manoel Tenorio, Mountain View, CA (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 12/507,464

(22) Filed: Jul. 22, 2009

(65) Prior Publication Data

US 2009/0281918 A1    Nov. 12, 2009

Related U.S. Application Data

(62) Division of application No. 09/970,052, filed on Oct. 3, 2001, now Pat. No. 7,650,305.

(51) Int. Cl.
*G06Q 40/00* (2006.01)
(52) U.S. Cl. .......................................... 705/35; 705/37
(58) Field of Classification Search .............. 705/1–45; 463/6, 25, 43; 273/146, 274, 292; 706/20, 706/46
See application file for complete search history.

(56) References Cited

U.S. PATENT DOCUMENTS

| | | | |
|---|---|---|---|
| 5,710,887 A | 1/1998 | Chelliah et al. | |
| 6,012,046 A * | 1/2000 | Lupien et al. | 705/36 R |
| 6,172,428 B1 | 1/2001 | Jordan | |
| 6,408,282 B1 | 6/2002 | Buist | |
| 7,349,879 B2 | 3/2008 | Alsberg et al. | |
| 2002/0032633 A1 | 3/2002 | Okumura | |
| 2010/0179902 A1 * | 7/2010 | May | 705/37 |
| 2010/0179925 A1 * | 7/2010 | Hawrysz | 705/36 R |

OTHER PUBLICATIONS

Stephen Few, "Intelligent Dashboard Design," Sep. 2005, Perceptual Edge, p. 1-14.
David G. Messerschmitt, "Understanding Networked Applications," 2000, pp. 83-86, 451-453.
Jane Chen et al, "Can Advergaming be the Future of Interactive Advertising?," undated, www.kpe.com/ourwork/view points. advergaming_4_shtml, visited Aug. 6, 2001.

(Continued)

*Primary Examiner*—Mary Cheung
*Assistant Examiner*—Marissa Liu
(74) *Attorney, Agent, or Firm*—Booth Udall, PLC; Steven J. Laureanti (57) ABSTRACT

A system for generating a display of at least one side of a market includes a computer system having one or more computers. The displayed side of the market includes one or more offers from one or more market participants. Each offer includes an offered price and an offered quantity. The computer system receives market data reflecting the one or more offers and generates a display of the received market data. The display includes a price axis, a quantity axis, and one or more offer bars. Each offer bar represents one or more offers including equal offered prices. Placement of an offer bar along the price axis represents the equal offered prices for the one or more offers represented by the offer bar. The height of an offer bar relative to the quantity axis represents the aggregate offered quantity for the one or more offers represented by the offer bar.

17 Claims, 5 Drawing Sheets

OTHER PUBLICATIONS www.klangundkleid.ch/competition/start.asp, visited Sep. 27, 2001.
www.sitebranding.com/how_it_works.htm, visited Aug. 6, 2001.
@The Moment: The Platform for Real-Time Trading; "How Quickly Can You Respond to Your Markets?," pp. 1, 2001.
@The Moment Solutions; "Dynamic Trading for a Dynamic World," pp. 1, 2001.
Trade@The Moment: The Platform for Real-Time Trading; pp. 1-2, 2001.
@The Moment Professional Services; pp. 1, 2001.
@The Moment Trade@The Moment FAQ; "Frequently Asked Questions (FAQ) About Dynamic Trading," pp. 1-9, 2001.
Trade@The Moment Demos; pp. 1, 2001.
@The Moment Screen Shots; pp. 1-3, 2001.
Market Operator Navigation; pp. 1, 2001.
Market Type Selection Page; pp. 1-2, 2001.
Market Access Control Selection Page; pp. 1-2, 2001.
Market Report; "marketplace@themoment;" pp. 1, 2001.
Bid/Ask Pricing Page, pp. 1-4, 2001.
Auction Page; pp. 1-4, 2001.
Bid/Ask Page/Pitometer; pp. 1-4, 2001.
Bid/Ask Page/Order Book; pp. 1-4, 2001.
@TheMoment Technology; pp. 1-2, 2001.
@TheMoment Papers; pp. 1, 2001.
@TheMoment Reliant Energy Customer Story, Reliant Energy Turns to @TheMoment to Provide First ERCOT Auction for Electricity Generation Capacity; pp. 1-2.
@TheMoment White Papers; pp. 1, 2001.
@TheMoment White Paper Series; "Leveraging Web-Based Dynamic Trading for Gas Pipeline Capacity Sales;" pp. 1-8, Jul. 2001.
@TheMoment White Paper Series; "Building Competitive Advantage in Turbulent Markets Through Web-Based Dynamic Trading Technologies;" pp. 1-12, Aug. 2001.
@TheMoment White Paper Series; Reducing Inventory Risks in High-Tech Component Manufacturing with Forward Contracts; pp. 1-12, Aug. 2001.
@TheMoment White Paper Series; "The Role off Web-Based Dynamic Trading in Restructured Electric and Gas Markets;" pp. 1-14, Oct. 2001.
Trade@TheMoment: LDC Data Sheet, "The Complete Trading Solution for LDCs;" pp. 1-4, Oct. 2001.
Trade@TheMoment: Power Data Sheet, "The Complete Trading Solution for Electric Utilities;" pp. 1-2, Nov. 2001.

* cited by examiner

DISPLAYING MARKET DATA

CLAIM OF PRIORITY

This is a divisional of U.S. patent application Ser. No. 09/970,052, filed on 3 Oct. 2001 and entitled "Displaying Market Data," now U.S. Pat. No. 7,650,305. U.S. Pat. No. 7,650,305 is commonly assigned to the assignee of the present application. The disclosure of related U.S. Pat. No. 7,650,305 is hereby incorporated by reference into the present disclosure as if fully set forth herein.

BACKGROUND

1. Technical Field of the Invention

This invention relates generally to electronic commerce and more particularly to facilitating order entry.

2. Background of the Invention

Business transactions are increasingly taking place over the Internet and other electronic communication networks. Electronic markets may provide a forum for such transactions, allowing buyers to locate sellers, and vice versa. This process may involve a buyer (or seller) identifying a seller (or buyer) offering to sell (or buy) a suitable quantity of a particular item at a suitable price. Typically, the buyer wants to buy at the lowest possible price, and the seller wants to sell at the highest possible price. It may be advantageous for a buyer (or seller) to monitor market conditions and buy (or sell) when such conditions meet certain criteria favorable to the buyer (or seller). However, market conditions may be subject to constant change, and such changes may occur rapidly. It may therefore be difficult for a buyer (or seller) to monitor market conditions and make buy (or sell) decisions based on market conditions meeting certain criteria. Additionally, a buyer (or seller) may only want to buy from (or sell to) certain sellers (or buyers) participating in the market, which may limit options available to the buyer (or seller) and make it more difficult to determine whether market conditions are favorable.

SUMMARY OF THE INVENTION

According to the present invention, disadvantages and problems associated with previous market display techniques may be substantially reduced or eliminated.

In one embodiment of the present invention, a system for generating a display of at least one side of a market includes a computer system having one or more computers. The displayed side of the market includes one or more offers from one or more market participants. Each offer includes an offered price and an offered quantity. The computer system receives market data reflecting the one or more offers and generate a display of the received market data. The display includes a price axis, a quantity axis, and one or more offer bars. Each offer bar represents one or more offers including substantially equal offered prices. Placement of an offer bar along the price axis represents the substantially equal offered prices for the one or more offers represented by the offer bar. The height of an offer bar relative to the quantity axis representing the aggregate offered quantity for the one or more offers represented by the offer bar. The computer system accesses an average price specified by a user, calculates an offered quantity available at the specified average price based on the received market data, and indicates the calculated offered quantity within the display of the received market data.

Particular embodiments of the present invention may provide one or more technical advantages. For example, particular embodiments may provide a display of market data that includes a substantially real-time graphical representation of market conditions. Particular embodiments may calculate and display a quantity of items that may be bought (or sold) at a particular average buy (or sell) price under current market conditions. Particular embodiments may facilitate order entry based on a calculated and displayed quantity of items that may be bought (or sold) at a particular average buy (or sell) price under current market conditions. Particular embodiments may calculate and display an average buy (or sell) price at which a particular quantity of items may be bought (or sold) under current market conditions. Particular embodiments may also facilitate order entry based on a calculated and displayed average buy (or sell) price at which a particular quantity of items may be bought (or sold) under current market conditions. Particular embodiments may incorporate one or more approved seller (or buyer) lists into a substantially real-time graphical representation of market conditions. Incorporating an approved seller (or buyer) list into a substantially real-time graphical representation of market conditions may enable a buyer (or seller) to more easily monitor market conditions in light of such a list. Particular embodiments may provide a display of market data that includes a plot of average buy (or sell) prices as a function of quantity and a plot of average buy (or sell) prices as a function of both quantity and one or more approved seller (or buyer) lists, which may highlight price differences the two price curves as well as costs associated with the exclusion of certain sellers (or buyers). Particular embodiments may similarly provide a display of market data that includes a plot of average sell prices as a function of quantity and a plot of average sell prices as a function of both quantity and one or more approved buyer lists, which may highlight price differences the two price curves as well as costs associated with the exclusion of certain buyers.

Systems and methods incorporating one or more of these or other technical advantages may be well suited for modem electronic markets. Other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
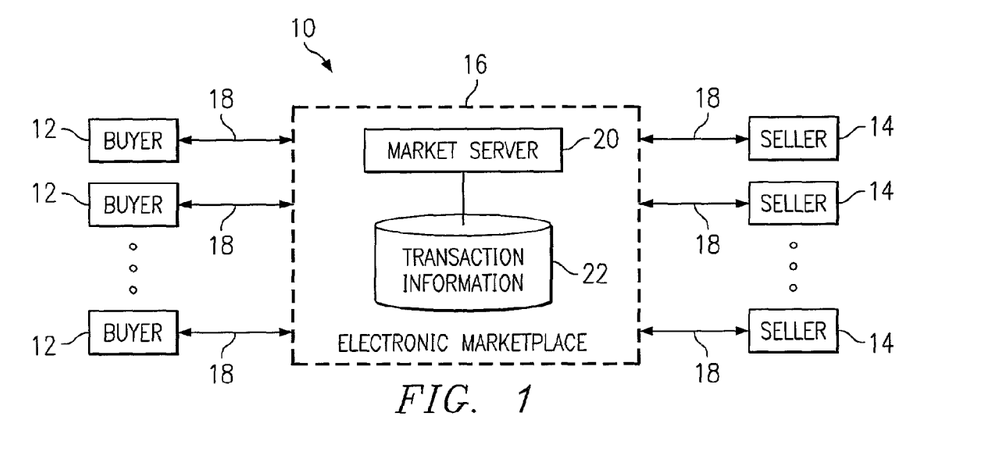
FIG. 1 illustrates an example system for displaying market data.

FIG. 1 illustrates an example system 10 for displaying market data. System 10 may include one or more buyers 12, one or more sellers 14, and at least one electronic marketplace 16 associated with a web site or other environment accessible to buyers 12 and sellers 14. In general, electronic marketplace 16 may receive bids from buyers 12 and asks from sellers 14 and, when a strike occurs, initiate a transaction between the corresponding buyer 12 and seller 14. A bid may include an offer to buy a particular number of items at a particular price, and an ask may include an offer to sell a particular number of items at a particular price. A bid may therefore include a bid price and a bid quantity, and an ask may similarly include an ask price and an ask quantity. A strike between a particular bid and a particular ask may occur when the corresponding bid price is greater than or substantially equal to the corresponding ask price and may result in a transaction between the corresponding buyer 12 and seller 14. Items may include raw materials, component parts, products, or any other tangible or intangible things that may be the subject of a transaction between a buyer 12 and a seller 14, and a single item may include one or more other items. Additionally, items may include lots, blocks, bundles, bushels, or other suitable units of one or more individual items, where appropriate. For example, capacitors may be bought and sold in indivisible units of five hundred capacitors, instead of one capacitor at a time.

Although buyers 12 and sellers 14 are described as separate entities, a buyer 12 in one transaction may be a seller 14 in another transaction, and vice versa. Moreover, reference to a "buyer" or a "seller" may include a person, a computer system having one or more computers, an enterprise, or any other buying or selling entity, as appropriate. For example, a buyer 12 may include a computer programmed to autonomously identify a need for an item, search for that item, and buy that item upon identifying a suitable seller. Although buying and selling are primarily described herein, the present invention contemplates any appropriate market transaction.

Buyers 12, sellers 14, and electronic marketplace 16 may be coupled to each other using links 18 that may each include one or more local area networks (LANs), metropolitan area networks (MANs), wide area networks (WANs), a portion of the Internet, or any other appropriate wireline, optical, wireless, or other links. The components of electronic marketplace 16 may operate on one or more computers at one or more locations, and electronic marketplace 16 may share one or more computers or other resources with one or more buyers 12 or one or more sellers 14, according to particular needs. Bids and asks may be received by electronic marketplace 16 or an associated device in any suitable format, such as in the form of Hypertext Markup Language (HTML), Extensible Markup Language (XML), or other suitable files within Hypertext Transport Protocol (HTTP) messages.

Associated with electronic marketplace 16 may be one or more market servers 20 and one or more databases containing transaction information 22. In general, market server 20 may support a particular electronic market for a particular item or set of items. For example, market server 20 may receive bids from buyers 12 and asks from sellers 14, prioritize bids and asks, determine when a strike occurs between a particular bid and ask, determine a strike price, cancel or otherwise remove from the market a bid or ask (automatically or at the request of the corresponding buyer 12 or seller 14), keep a record of a particular strike by storing associated transaction information 22, initiate a transaction between buyer 12 and seller 14 when a strike occurs, and perform other suitable tasks associated with supporting an electronic market. In addition, market server 20 may perform tasks associated with providing a display of market data. For example, market server 20 may communicate market data to one or more buyers 12, sellers 14, or other suitable entities, which data may be used by the recipients to generate market displays. Transaction information 22 may include a number of records, each corresponding to a particular strike. A record of a strike may reflect a strike price, a date and time, information identifying buyer 12 and seller 14, and a strike quantity. Transaction information 22 may be used by buyer 12, seller 14, and any other appropriate entities to finalize a transaction between buyer 12 and seller 14 initiated as the result of a strike or for any other suitable purposes.

Figure 2:
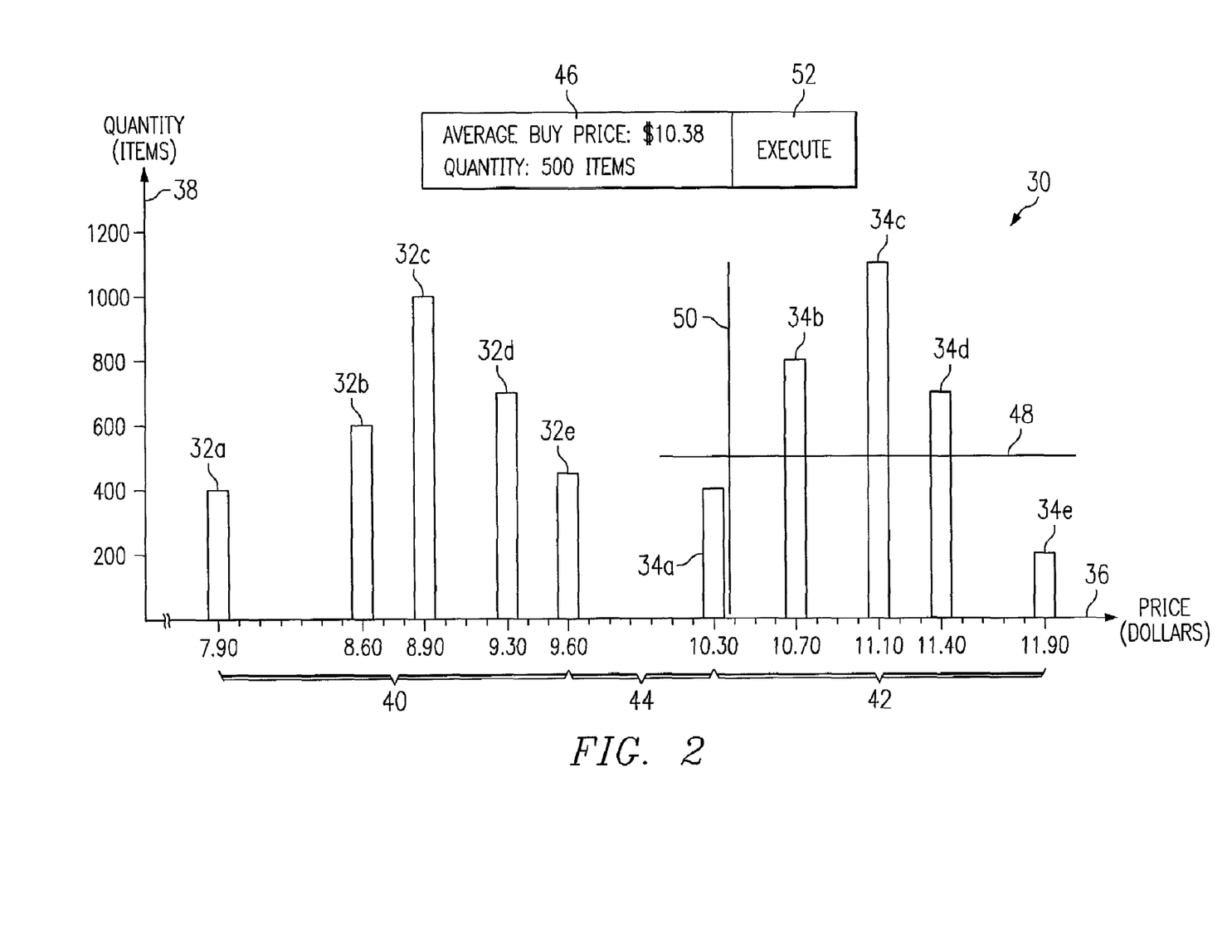
FIG. 2 illustrates an example display of market data.

FIG. 2 illustrates an example display 30 of market data. Market data may include any suitable information reflecting market conditions, which may include existing bid and ask prices, existing bid and ask quantities, and other market conditions. Display 30 may be generated in any suitable manner for use by any suitable market participants. In one embodiment, for example, market server 20 may communicate market data to a computer system having one or more computers associated with a particular buyer 12, which computer system may, using the market data, generate display 30 for the exclusive use of buyer 12. In another embodiment, for example, market server 20 may locally generate all or certain portions of display 30 for a particular buyer 12 and communicate corresponding display data to a computer system associated with buyer 12 for the exclusive use of buyer 12. In another embodiment, for example, market server 20 may locally generate certain portions of display 30 for use by any number of buyers 12 or sellers 14 and communicate corresponding display data to a computer system associated with a particular buyer 12, which computer system may modify display 30 (which may include generating further portions of display 30) for buyer 12. Moreover, display 30 may be updated as changes in market conditions occur (which may include bids and asks being placed on the market, bids and asks being removed from the market, and other changes) to provide a substantially real-time representation of market conditions.

Display 30 may include one or more bid bars 32 and one or more ask bars 34. Bid bars 32 may each represent one or more bids at a particular bid price, and ask bars 34 may each represent one or more asks at a particular ask price. Bid prices corresponding to bid bars 32 may be graphically represented by the placement of bid bars 32 along price axis 36, which may include per-item prices. Ask prices corresponding to ask bars 34 may similarly be graphically represented by the placement of ask bars 34 along price axis 36. The total bid quantity at a particular bid price may be graphically represented by the height of the corresponding bid bar 32 relative to quantity axis 38, and the total ask quantity at a particular ask price may be graphically represented by the height of the corresponding ask bar 34 relative to quantity axis 38. For example, bid bar 32*d* may indicate that there is a total bid quantity of seven hundred items at a bid price of $9.30, and ask bar 34*c* may indicate that there is a total ask quantity of eleven hundred items at an ask price of $11.10. As described above, buyers 12 may generally want to buy at lower prices and sellers 14 may generally want to sell at higher prices. For this and possibly other reasons, bid prices may generally fall within a lower range 40 of prices, ask prices may generally fall within a higher range 42 of prices, and price ranges 40 and 42 may generally be separated from each other by a spread 44, which may represent the price difference between the leading bid price and the leading ask price. Although example display 30 is described and illustrated herein as including bid bars 32 and ask bars 34, the present invention contemplates any suitable information being included within or excluded from display 30, according to particular needs. For example, display 30 may exclude bid bars 32 and include ask bars 34, providing a display of market data only for the ask side of the market. As another example, display 30 may exclude ask bars 34 and include bid bars 32, providing a display of market data only for the bid side of the market.

Display 30 may also include one or more windows 46 for entering average buy (or sell) prices and displaying calculated quantities corresponding to entered average buy (or sell) prices. For example, a buyer 12 using display 30 may enter an average buy price, and the quantity of items that may be bought at the entered average buy price under current market conditions may be calculated and displayed within window 46. In addition or as an alternative, window 46 may be used for entering quantities of items and displaying calculated average buy (or sell) prices corresponding to entered quantities. For example, buyer 12 may enter a quantity of items, and the average buy price for the entered quantity of items under current market conditions may be calculated and displayed within window 46. Any suitable combination of hardware and software supporting display 30 may calculate quantities and average prices. As an example of the concepts described above and not by way of limitation, buyer 12 may enter an average buy price of $10.38, and a calculated quantity of five hundred items (the quantity of items that may be bought at an average buy price of $10.38 under the market conditions shown in example market display 30) may be displayed within window 46. As another example, buyer 12 may enter a quantity of eleven hundred items, and a calculated average price of $10.55 (the average buy price at which eleven hundred items may be bought under the market conditions shown in example market display 30) may be displayed within window 46. Although a buyer 12 is particularly described as using window 46 to enter an average buy price or quantity, the present invention contemplates any suitable user making use of window 46 for any suitable purpose. For example, a seller 14 may use window 46 to enter an average sell price or quantity, and a corresponding quantity or average sell price may displayed within window 46 or elsewhere within display 30, as described below.

In addition or as an alternative to being displayed within window 46, entered quantities and average buy (or sell) prices and calculated quantities and average buy (or sell) prices may be graphically displayed using one or more quantity bars 48 and one or more average price bars 50, respectively. As described above, for example, buyer 12 may enter an average buy price of $10.38, and a calculated quantity of five hundred items may be displayed within window 46. In addition or as an alternative to the display within window 46, quantity bar 48 may be generated within market display 30 and placed along quantity axis 38 according to the calculated quantity of five hundred items. Additionally, average price bar 50 may be generated within market display 30 and placed along price axis 36 according to the entered average price of $10.38. As another example, buyer 12 may enter a quantity of eleven hundred items, and a calculated average price of $10.55 may be displayed within window 46. In addition or as an alternative to the display within window 46, average price bar 50 may be generated within market display 30 and placed along price axis 36 according to the calculated average price of $10.55. Additionally, quantity bar 48 may be generated within market display 30 and placed along quantity axis 38 according to the entered quantity of eleven hundred items. Although example quantity bar 48 and example average price bar 50 are described and illustrated herein, the present invention contemplates any suitable bars or other graphical representations of entered quantities and average buy (or sell) prices and calculated quantities and average buy (or sell) prices. Although average price bar 50 and quantity bar 48 have been particularly described as being used to graphically display for a buyer 12 average buy prices and corresponding quantities, the present invention contemplates any suitable information being displayed using quantity bar 48 and average price bar 50 for any suitable user. For example, average price bar 50 and quantity bar 48 may be used to graphically represent average sell prices and corresponding quantities for a seller 14.

Display 30 may also include one or more execution icons 52, which may facilitate order entry by a user. An order may include a bid or an ask, as appropriate. Where an order includes a bid, the order may include a bid price, a bid quantity, or both a bid price and a bid quantity, according to particular needs. Similarly, where an order includes an ask, the order may include an ask price, an ask quantity, or both an ask price and ask quantity, according to particular needs. In particular, execution icon 52 may be used to cause one or more orders to be automatically generated based on information displayed within window 46 or elsewhere within display 30 and communicated to market server 20 for execution. For example, a buyer 12 using display 30 may enter an average buy price, and the quantity of items that may be bought at the entered average buy price under current market conditions may be calculated and displayed within window 46 or elsewhere within display 30, as described above. Buyer 12 may use execution icon 52 to cause one or more bids for the calculated and displayed quantity of items at the entered average buy price to be automatically generated and communicated to market server 20 for matching with one or more appropriate asks. Buyer 12 may, in addition or as an alternative, enter a quantity of items, and the average buy price at which the entered quantity of items may be bought under current market conditions may be displayed within window 46 or elsewhere within display 30, as described above. Buyer 12 may use execution icon 52 to cause one or more bids for the entered quantity of items at the calculated and displayed average buy price to be automatically generated and communicated to market server 20 for matching with one or more appropriate asks.

Although execution icon 52 has been particularly described as being used by a buyer 12, the present invention contemplates any suitable user making use of execution icon 52 for any suitable purpose. For example, a seller 14 using display 30 may use execution icon 52 to cause one or more asks to be automatically generated based on information displayed within window 46 or elsewhere within display 30 and communicated to market server 20 for matching with one or more appropriate bids. Any suitable combination of hardware and software supporting display 30 may generate an order based on information displayed within window 46 or elsewhere within display 30 and communicate the generated order to market server 20 in response to a user selecting execution icon 52 or otherwise indicating a desire to buy or sell. Although example execution icon 52 is particularly described and illustrated herein, the present invention contemplates a user indicating a desire to cause an order to be generated based on information displayed within window 46 or elsewhere within display 30 and subsequently communicated to market server 20 in any suitable manner.

As an example of the concepts described above and not by way of limitation, a buyer 12 using display 30 may enter an average buy price of $10.38, and a corresponding quantity of five hundred items may be displayed within window 46 and using quantity bar 48, as described above. Buyer 12 may then (possibly after making a buy decision based on the information within display 30) select execution icon 52 or otherwise indicate a desire to buy five hundred items at an average buy price of $10.38, which may cause a bid for four hundred items at a bid price of $10.30 and a bid for one hundred items at a bid price or $10.70 to be automatically generated and communicated to market server 20 for matching with one or more appropriate asks. Since four hundred items are available at $10.30 and one hundred items are available at $10.70 under current market conditions, the bids communicated to market server 20 may be matched with one or more appropriate asks within a substantially short time of being received by market server 20. As another example, buyer 12 may enter a quantity of eleven hundred items, and a corresponding average buy price of $10.55 may be displayed within window 46 and using average price bar 50, as described above. Buyer 12 may then select execution icon 52, which may cause a bid for four hundred items at a bid price of $10.30 and a bid for seven hundred items at a bid price of $10.70 to be automatically generated and communicated to market server 20 for matching with one or more appropriate asks. Since four hundred items are available at $10.30 and seven hundred items are available at $10.70 under current market conditions, the bids communicated to market server 20 may be matched with one or more appropriate asks within a substantially short time of being received by market server 20.

Figure 3:
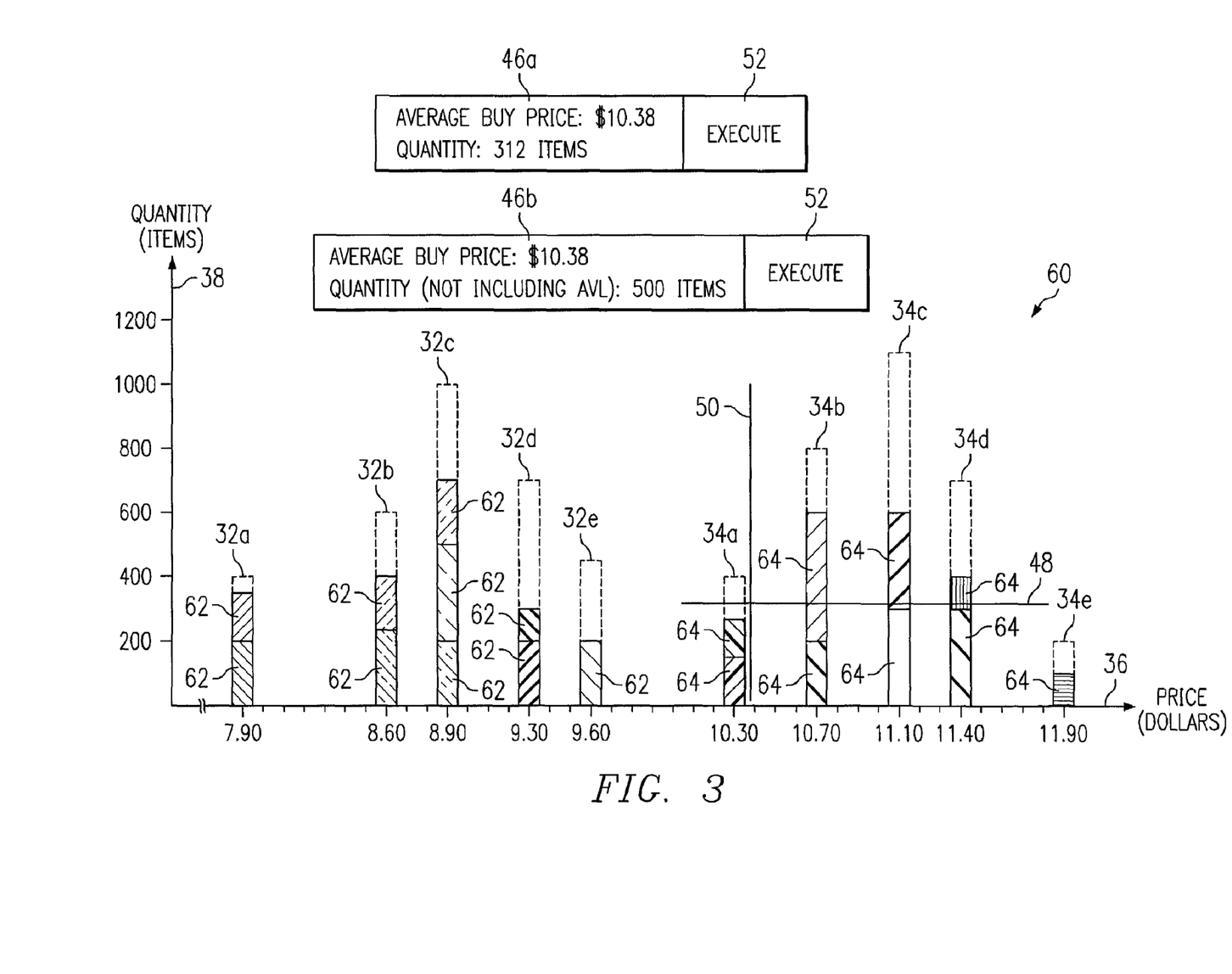
FIG. 3 illustrates another example display of market data.

FIG. 3 illustrates another example display 60 of market data. Display 60 may incorporate one or more approved seller lists and one or more approved buyer lists into a substantially real-time graphical representation of market conditions. An approved seller list may include a list of sellers 14 from which a particular buyer 12 may buy one or more items. Buyer 12 may decline to buy from sellers 14 excluded from the list. Similarly, an approved buyer list may include a list of buyers 12 to which a particular seller 14 may sell one or more items, and seller 14 may decline to sell to excluded buyers 12. Buyers 12 and sellers 14 may choose to transact business only with certain sellers 14 and buyers 12 for any suitable reasons. For example, a particular buyer 12 may prefer to buy from sellers 14 within a certain geographic area. Approved seller lists for a particular buyer 12 may vary from item to item, and approved buyer lists for a particular seller 14 may vary from item to item. For example, an approved seller list for item A for a particular buyer 12 may include a particular seller 14, while an approved seller list for item B for buyer 12 may exclude seller 14. Excluding one or more sellers 14 may affect market conditions for a particular buyer 12, and excluding one or more buyers 12 may affect market conditions for a particular seller 14. For example, excluding one or more sellers 14 from a particular market may result in there effectively being fewer asks, which may affect ask prices and ask quantities available to a particular buyer 12.

Display 60 may be generated in any suitable manner for use by any suitable market participants. In one embodiment, for example, market server 20 may communicate market data to a computer system having one or more computers associated with a particular buyer 12, which computer system may, using the market data, generate display 60 for the exclusive use of buyer 12. In another embodiment, for example, market server 20 may locally generate all or certain portions of display 60 for a particular buyer 12 and communicate corresponding display data to a computer system associated with buyer 12 for the exclusive use of buyer 12. In another embodiment, for example, market server 20 may locally generate certain portions of display 60 for use by any number of buyers 12 or sellers 14 and communicate corresponding display data to a computer system associated with a particular buyer 12, which computer system may modify display 60 (which may include incorporating one or more approved seller lists into the previously generated portions of display 60) for buyer 12. Moreover, display 60 may be updated as changes in market conditions occur (which may include bids and asks being placed on the market, bids and asks being removed from the market, and other changes) to provide a substantially real-time representation of market conditions.

Display 60 may incorporate one or more approved seller lists and one or more approved buyer lists into a substantially real-time graphical representation of market conditions in any suitable manner. For example, display 60 may include bid bars 32, ask bars 34, price axis 36, and quantity axis 38, similar to display 30. However, in contrast to display 30, bid bars 32 within display 60 may each be divided into bid segments 62, each corresponding to a particular bid from a particular buyer 12. Bid quantity may be represented by the length of the corresponding bid segment 62, and buyer identity may be represented by the marking, shading, coloring, or other aspect of corresponding bid segment 62. Bids from buyers 12 excluded from one or more applicable approved buyer lists may be excluded from market display 60. For example, bid bar 32c may, as a result of the exclusion of one or more buyers 12 from one or more applicable approved buyer lists, indicate that there is a bid quantity of only seven hundred items available at a bid price of $8.90, instead of one thousand items. As an alternative, bids from buyers 12 excluded from one or more applicable approved buyer lists may be included in market display 60, but distinctly marked, shaded, colored, or otherwise identified as being from an excluded buyer 12.

Bids at a particular bid price may be prioritized according to any suitable prioritization scheme. For example, earlier-received bids at a particular bid price may be given higher priority than later-received bids at the same bid price, bid segments 62 within a particular bid bar 32 that correspond to higher-priority bids may be graphically placed on top of bid segments 62 within bid bar 32 that correspond to lower-priority bids, and higher-priority bids at a particular bid price may be matched with one or more asks before lower-priority bids at the same bid price are matched with one or more asks. As another example, bids from preferred buyers 12 at a particular bid price may be given higher priority than bids from other buyers 12 at the same bid price, which preferences may be indicated by one or more approved buyer lists for a particular seller 14, bid segments 62 within a particular bid bar 32 that correspond to higher-priority bids may be graphically placed on top of bid segments 62 within bid bar 32 that correspond to lower-priority bids, and higher-priority bids at a particular bid price may, using any suitable technique, be matched with asks from seller 14 before lower-priority bids at the same bid price are matched with asks from seller 14.

Similar to bid bars 32, ask bars 34 may also be divided into ask segments 64, each corresponding to a particular ask from a particular seller 14. Ask quantity may be represented by the length of corresponding ask segment 64, and seller identity may be represented by the marking, shading, coloring, or other aspect of corresponding ask segment 64. Asks from sellers 14 excluded from one or more applicable approved seller lists may be excluded from market display 60. For example, ask bar 34c may, as a result of the exclusion of one or more sellers from one or more applicable approved buyer lists, indicate that there is an ask quantity of only six hundred items at an ask price of $11.10, instead of eleven hundred items. As an alternative, asks from sellers 14 excluded from one or more applicable approved seller lists may be included in market display 60, but distinctly marked, shaded, colored, or otherwise identified as being from an excluded seller 14. Asks at a particular ask price may be prioritized according to any suitable prioritization scheme. For example, earlier-received asks at a particular ask price may be given higher priority than later-received asks at the same ask price, ask segments 64 within a particular ask bar 34 that correspond to higher-priority asks may be graphically placed on top of ask segments 64 within ask bar 34 that correspond to lower-priority asks, and higher-priority asks at a particular ask price may be matched with one or more bids before lower-priority asks at the same ask price are matched with one or more bids.

Similar to bids at a particular bid price, asks at a particular ask price may be prioritized according to any suitable prioritization scheme. For example, earlier-received asks at a particular ask price may be given higher priority than later-received asks at the same ask price, ask segments 64 within a particular ask bar 34 that correspond to higher-priority asks may be graphically placed on top of ask segments 64 within ask bar 34 that correspond to lower-priority asks, and higher-priority asks at a particular ask price may be matched with one or more bids before lower-priority asks at the same ask price are matched with one or more bids. As another example, asks from preferred sellers 14 at a particular ask price may be given higher priority than asks from other sellers 14 at the same ask price, which preferences may be indicated by one or more approved seller lists for a particular buyer 12, ask segments 64 within a particular ask bar 34 that correspond to higher-priority asks may be graphically placed on top of ask segments 64 within ask bar 34 that correspond to lower-priority asks, and higher-priority asks at a particular ask price may, using any suitable technique, be matched with bids from buyer 12 before lower-priority asks at the same ask price are matched with bids from seller 14.

Display 60 may also include one or more windows 46, described above, for entering average buy (or sell) prices and displaying calculated quantities corresponding to entered average buy (or sell) prices. In addition or as an alternative, one or more windows 46 may be used for entering quantities of items and displaying calculated average buy (or sell) prices corresponding to entered quantities. For example, display 60 may include window 46a for displaying calculated quantities and average buy (or sell) prices taking into account one or more approved seller (or buyer) lists. Display 60 may also include window 46b for displaying calculated quantities and average buy (or sell) prices not taking into account such lists, which may allow for a comparison of prices and quantities taking into account one or more approved seller (or buyer) lists with prices and quantities not taking into account such lists. Such a comparison may highlight costs associated with excluding one or more sellers (or buyers). Any suitable combination of hardware and software supporting display 60 may calculate quantities and average prices. Entered quantities and average buy (or sell) prices and calculated quantities and average buy (or sell) prices may, in addition or as an alternative to being displayed within a window 46, be graphically displayed within display 60 using quantity bars 48 and average price bars 50, described above.

As an example of the concepts described above and not by way of limitation, a buyer 12 using display 60 may enter an average buy price of $10.38, and a calculated quantity of three hundred twelve items (which may be the quantity of items that may be bought at an average buy price of $10.38 under the market conditions shown in example display 60 taking into account one or more approved seller lists for buyer 12) may be displayed within window 46a. Additionally, a calculated quantity of five hundred items (which may be the quantity of items that may be bought at an average buy price of $10.38 under the market conditions shown in example display 60 not taking into account such lists) may be displayed within window 46b. A comparison of the calculated quantity (three hundred twelve items) for an average buy price of $10.38 taking into account one or more approved seller lists for buyer 12 with the calculated quantity (five hundred items) for an average buy price of $10.38 not taking into account such lists may highlight the costs associated with buyer 12 excluding one or more sellers 14 (one hundred eighty-eight more items may be bought at an average buyer price of $10.38 when one or more approved seller lists for buyer 12 are not taken into account). As another example, buyer 12 may enter a quantity of eleven hundred items, and a calculated average price of $10.70 (which may be the average buy price at which eleven hundred items may be bought under the market conditions shown in example display 60 taking into account one or more approved seller lists for buyer 12) may be displayed within window 46a. Additionally, a calculated average price of $10.55 (which may be the average buy price at which eleven hundred items may be bought under the market conditions shown in example display 60 not taking into account such lists) may be displayed within window 46b. A comparison of the calculated average buy price ($10.70) for a quantity of eleven hundred items taking into account one or more approved seller lists for buyer 12 with the calculated average buy price ($10.55) for the same quantity of items not taking into account such lists may highlight the costs associated with buyer 12 excluding one or more sellers 14 (a quantity of eleven hundred items may be bought at an average buy price $0.15 lower when one or more approved seller lists for buyer 12 are not taken into account).

Display 60 may also include one or more execution icons 52, which may facilitate order entry by a user, as described above in reference to display 30. For example, a buyer 12 using display 60 may enter an average buy price, and the quantity of items that may be bought at the entered average buy price under current market conditions taking into account one or more approved seller lists for buyer 12 may be calculated and displayed within window 46a or elsewhere within display 30, as described above. Buyer 12 may use execution icon 52 to cause one or more bids for the calculated and displayed quantity of items at the entered average buy price to be automatically generated and communicated to market server 20 for matching with one or more appropriate asks. (There may also be an execution icon 52 associated with window 46b which buyer 12 may use to cause one or more bids for the quantity of items displayed within 46b at the entered average buy price to be automatically generated and communicated to market server 20.) Buyer 12 may, in addition or as an alternative, enter a quantity of items, and the average buy price at which the entered quantity of items may be bought under current market conditions taking into account one or more approved seller lists for buyer 12 may be displayed within window 46a or elsewhere within display 30, as described above. Buyer 12 may use execution icon 52 to cause one or more bids for the entered quantity of items at the calculated and displayed average buy price to be automatically generated and communicated to market server 20 for matching with one or more appropriate asks. (There may also be an execution icon 52 associated with window 46b which buyer 12 may use to cause one or more bids for the entered quantity of items at the average buy price displayed within 46b to be automatically generated and communicated to market server 20.)

Although execution icon 52 has been particularly described as being used by a buyer 12, the present invention contemplates any suitable user making use of execution icon 52 for any suitable purpose. For example, a seller 14 using display 60 may use execution icon 52 to cause one or more asks to be automatically generated based on information displayed within window 46 or elsewhere within display 60 and communicated to market server 20 for matching with one or more appropriate bids. Any suitable combination of hardware and software supporting display 60 may generate an order based on information displayed within window 46*a* or elsewhere within display 60 and communicate the generated order to market server 20 in response to a user selecting execution icon 52 or otherwise indicating a desire to buy or sell. Although example execution icon 52 is particularly described and illustrated herein, the present invention contemplates a user indicating a desire to cause an order to be generated based on information displayed within window 46*a* or elsewhere within display 60 and subsequently communicated to market server 20 in any suitable manner.

As an example of the concepts described above and not by way of limitation, a buyer 12 using display 60 may enter an average buy price of $10.38, and a corresponding quantity of three hundred twelve items may be displayed within window 46*a* and using quantity bar 48, as described above. Buyer 12 may then (possibly after making a buy decision based on the information within display 60) select execution icon 52 or otherwise indicate a desire to buy three hundred twelve items at an average buy price of $10.38, which may cause a bid for two hundred fifty items at a bid price of $10.30 and a bid for sixty-two items at a bid price or $10.70 to be automatically generated and communicated to market server 20 for matching with one or more appropriate asks. Since two hundred fifty items are available at $10.30 and sixty-two items are available at $10.70 under current market conditions taking into account one or more approved seller lists for buyer 12, the bids communicated to market server 20 may be matched with one or more appropriate asks within a substantially short time of being received by market server 20. As another example, buyer 12 may enter a quantity of eleven hundred items, and a corresponding average buy price of $10.70 may be calculated and displayed within window 46*a* and using average price bar 50, as described above. Buyer 12 may then select execution icon 52, which may cause a bid for two hundred fifty items at a bid price of $10.30, a bid for six hundred items at a bid price of $10.70, and a bid for two hundred fifty items at a bid price of $11.10 to be automatically generated and communicated to market server 20 for matching with one or more appropriate asks. Since two hundred fifty items are available at $10.30, six hundred items are available at $10.70, and two hundred fifty items are available at $11.10 under current market conditions taking into account one or more approved seller lists for buyer 12, the bids communicated to market server 20 may be matched with one or more appropriate asks within a substantially short time of being received by market server 20.

Figure 4:
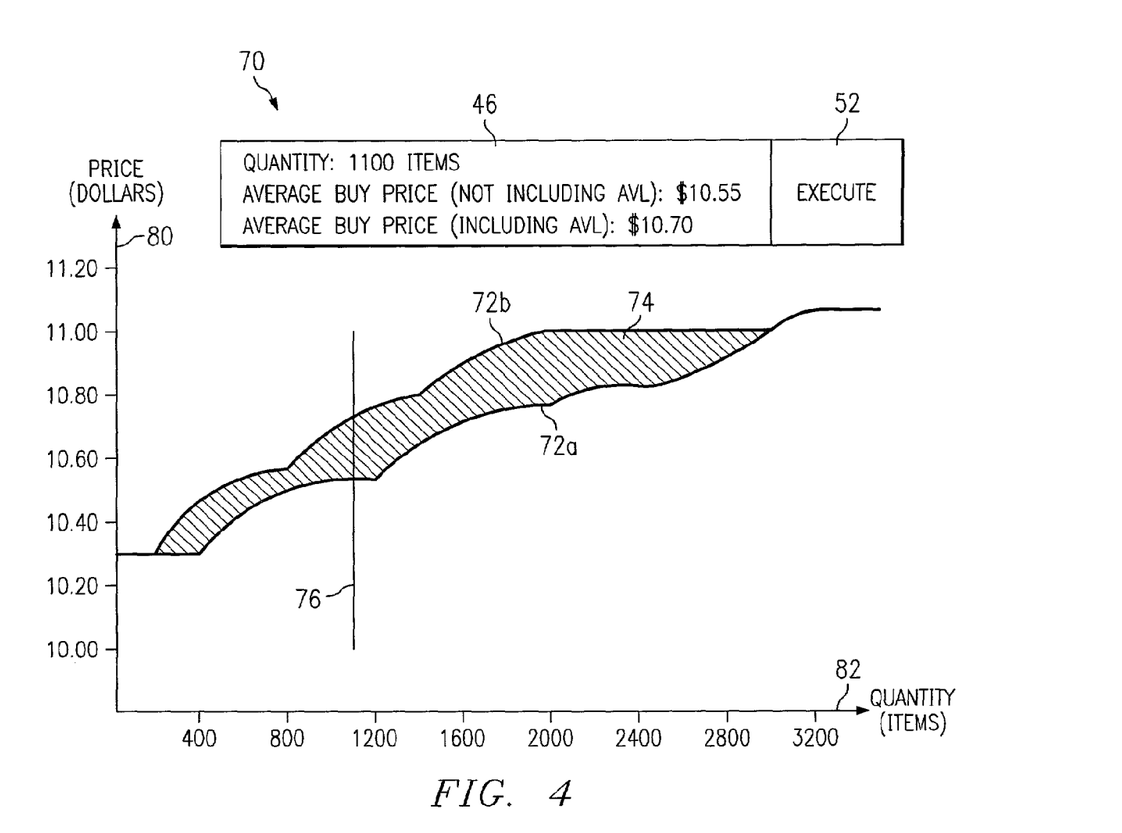
FIG. 4 illustrates another example display of market data.

FIG. 4 illustrates another example display 70 of market data. Display 70 may include one or more average buy price curves 72, which may each be a function of quantity and possibly one or more other variables. For example, average buy price curve 72*a* may include a plot of average buy price as a function of quantity, and average buy price curve 72*b* may include a plot of average buy price as a function of quantity and one or more approved seller lists for a buyer 12 using display 70. In general, average buy prices taking into account one or more approved seller lists for buyer 12 will be greater than average buy prices not taking into account such lists. Therefore, certain portions of price curve 72*a* may be separated from price curve 72*b* by area 74, which may represent the price difference between average buy prices taking into account one or more approved seller lists for buyer 12 and average buy price not taking into account such lists over a range of quantities. Although example display 70 is described and illustrated herein as including average buy price curves 72, the present invention contemplates display 70 including, in addition or as an alternative to average buy price curves 72, average sell price curves, which may be a function of quantity and possibly one or more other variables, such as one or more approved buyer lists for a particular seller 14.

Display 70 may be generated in any suitable manner for use by any suitable market participants. In one embodiment, for example, market server 20 may communicate market data to a computer system having one or more computers associated with a particular buyer 12, which computer system may, using the market data, generate display 60 for the exclusive use of buyer 12. In another embodiment, for example, market server 20 may locally generate all or certain portions of display 70 for a particular buyer 12 and communicate corresponding display data to a computer system associated with buyer 12 for the exclusive use of buyer 12. In another embodiment, for example, market server 20 may locally generate certain portions of display 70 for use by any number of buyers 12 or sellers 14 and communicate corresponding display data to a computer system associated with a particular buyer 12, which computer system may modify display 70 (which may include incorporating one or more approved seller lists into the previously generated portions of display 70) for buyer 12. Moreover, display 70 may be updated as changes in market conditions occur (which may include bids and asks being placed on the market, bids and asks being removed from the market, and other changes) to provide a substantially real-time representation of market conditions.

Display 70 may include one or more windows 46, described above, for entering average buy prices and displaying calculated quantities corresponding to entered average buy prices. For example, window 46 within display 70 may include a quantity display and two average buy price displays, one for average buy prices corresponding to price curve 72*a* and one for average buy prices corresponding to price curve 72*b*. A buyer 12 using average display 70 may enter a particular quantity of items, and the average buy price at which the entered quantity of items may be bought under current market conditions taking into account one or more approved seller lists for buyer 12 and the average buy price at which the entered quantity of items may be bought under current market conditions not taking into account such lists may be calculated and displayed within window 46. In addition or as an alternative, window 46 within display 70 may include an average buy price display and two quantity displays, one for quantities corresponding to price curve 72*a* and one for quantities corresponding to price curve 72*b*. Buyer 12 may enter a particular average buy price, and the quantity of items that may be bought at the entered average buy price under current market conditions taking into account one or more approved seller lists and the quantity of items that may be bought at the entered average buy price under current market conditions not taking into account such lists may be calculated and displayed within window 46. Any suitable combination of hardware and software supporting display 70 may calculate quantities and average prices.

As an example of the concepts described above and not by way of limitation, a buyer 12 using display 70 may enter a quantity of eleven hundred items, and the average buy price ($10.70) for eleven hundred items under current market conditions taking into account one or more approved seller lists for buyer 12 and the average buy price ($10.55) for eleven hundred items under current market conditions not taking into account such lists may be calculated and displayed within window 46. As another example, buyer 12 may enter an average buy price of $10.38, and the quantity of items (three hundred twelve) that may be bought at an average buy price of $10.38 under current market conditions taking into account one or more approved seller lists for buyer 12 and the quantity of items that may be bought under the current market conditions at an average buy price of $10.38 not taking into account such lists may be calculated and displayed within window 46.

In addition or as an alternative to being displayed within window 46, entered and calculated quantities and entered and calculated average buy prices may be graphically displayed using one or more price curve intersection bars 76. For example, a buyer 12 using display 70 may enter a quantity of eleven hundred items, and a price curve intersection bar 76 may be generated and vertically placed along quantity axis 82 within display 70 according to the entered quantity. The intersection of such a vertical price curve intersection bar 76 and buy price curve 72a may indicate that eleven hundred items may be bought at an average buy price $10.55 under current market conditions not taking into account one or more approved seller lists for buyer 12, and the intersection of the vertical price curve intersection bar 76 and buy price curve 72b may indicate that the eleven hundred items may be bought at an average buy price of $10.70 under current market conditions taking into account such lists. As another example, buyer 12 may enter an average buy price of $10.38, and a price curve intersection bar 76 may be generated and horizontally placed along price axis 80 according to the entered average buy price. The intersection of such a horizontal price curve intersection bar 76 and buy price curve 72a may indicate that five hundred items may be bought at an average buy price of $10.38 under current market conditions not taking into account one or more approved seller lists for buyer 12, and the intersection of the horizontal price curve intersection bar 76 and buy price curve 72b may indicate that three hundred twelve items may be bought at an average buy price of $10.38 under current market conditions not taking into account such lists. Although example price curve intersection bars 76 are described and illustrated herein, the present invention contemplates any suitable bars or other graphical representations of calculated and entered quantities and calculated and entered average prices being included within display 70.

Display 70 may also include one or more execution icons 52, which may facilitate order entry by a user, as described above in reference to displays 30 and 60. For example, a buyer 12 using display 70 may enter an average buy price, and the quantity of items that may be bought at the entered average buy price under current market conditions taking into account one or more approved seller lists for buyer 12 may be calculated and displayed within window 46 or elsewhere within display 70, as described above. Buyer 12 may use execution icon 52 to cause one or more bids for the calculated and displayed quantity of items at the entered average buy price to be automatically generated and communicated to market server 20 for matching with one or more appropriate asks. Buyer 12 may, in addition or as an alternative, enter a quantity of items, and the average buy price at which the entered quantity of items may be bought under current market conditions taking into account one or more approved seller lists for buyer 12 may be displayed within window 46 or elsewhere within display 70, as described above. Buyer 12 may use execution icon 52 to cause one or more bids for the entered quantity of items at the calculated and displayed average buy price to be automatically generated and communicated to market server 20 for matching with one or more appropriate asks. Although execution icon 52 has been particularly described herein as being used to automatically generate one or more bids based on current market conditions taking into account one or more approved seller lists for buyer 12, the present invention contemplates execution icon 52 being used to automatically generate one or more bids based on any suitable information displayed within window 46 or elsewhere within display 70. For example, execution icon 52 may be used to automatically generate one or more bids based on current market conditions not taking into account one or more approved seller lists for buyer 12.

Although execution icon 52 has been particularly described as being used by a buyer 12, the present invention contemplates any suitable user making use of execution icon 52 for any suitable purpose. For example, a seller 14 using display 70 may use execution icon 52 to cause one or more asks to be automatically generated based on information displayed within window 46 or elsewhere within display 70 and communicated to market server 20 for matching with one or more appropriate bids. Any suitable combination of hardware and software supporting display 70 may generate an order based on information displayed within window 46 or elsewhere within display 70 and communicate the generated order to market server 20 in response to a user selecting execution icon 52 or otherwise indicating a desire to buy or sell. Although example execution icon 52 is described and illustrated herein, the present invention contemplates a user indicating a desire to cause an order to be generated based on information displayed within window 46 or elsewhere within display 60 and communicated to market server 20 in any suitable manner.

As an example of the concepts described above and not by way of limitation, a buyer 12 using display 70 may enter an average buy price of $10.38, and a corresponding quantity of three hundred twelve items may be displayed within window 46 and using price curve intersection bar 76, as described above. Buyer 12 may then (possibly after making a buy decision based on the information within display 60) select execution icon 52 or otherwise indicate a desire to buy three hundred twelve items at an average buy price of $10.38, which may cause one or more bids for an aggregate quantity of three hundred twelve items at an average buy price of $10.38 to be automatically generated and communicated to market server 20 for matching with one or more appropriate asks. Since an aggregate quantity of three hundred twelve items is available at an average buy price of $10.38 under current market conditions taking into account one or more approved seller lists for buyer 12, the bids communicated to market server 20 may be matched with one or more appropriate asks within a substantially short time of being received by market server 20. As another example, buyer 12 may enter a quantity of eleven hundred items, and a corresponding average buy price of $10.70 may be calculated and displayed within window 46 and using average price bar 50, as described above. Buyer 12 may then select execution icon 52, which may cause one or more bids for an aggregate quantity of eleven hundred items at an average buy price of $10.70 to be automatically generated and communicated to market server 20 for matching with one or more appropriate asks. Since eleven hundred items are available at an average buy price of $10.70 under current market conditions taking into account one or more approved seller lists for buyer 12, the bids communicated to market server 20 may be matched with one or more appropriate asks within a substantially short time of being received by market server 20.

Figure 5:
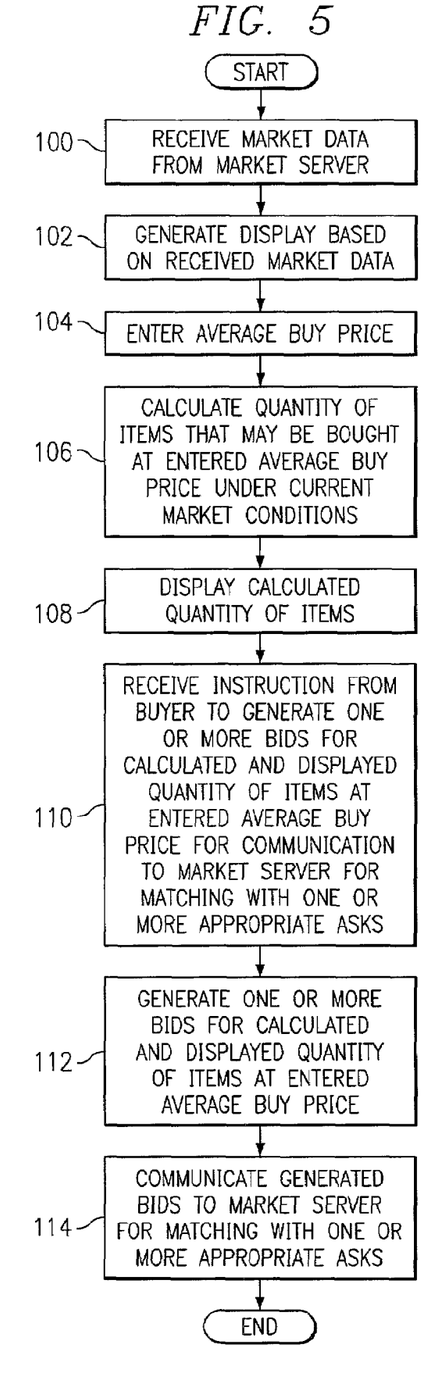
FIG. 5 illustrates an example method for generating an example display of market data and facilitating order entry.

FIG. 5 illustrates an example method for generating example display 30 and facilitating order entry. The method begins at step 100, where a computer system having one or more computers associated with a particular buyer 12 for generating display 30 receive market data from market server 20. At step 102, the computer system generates display 30 based on the received market data. In another embodiment, as described above, market server 20 may locally generate all or certain portions of display 30 for a particular buyer 12 and communicate corresponding display data to a computer system associated with buyer 12 for the exclusive use of buyer 12. In yet another embodiment, market server 20 may locally generate certain portions of display 30 for use by any number of buyers 12 or sellers 14 and communicate corresponding display data to a computer system associated with a particular buyer 12, which computer system may modify display 30 (which may include generating further portions of display 30) for buyer 12. As described above, display 30 may include bid bars 32 and ask bars 34 placed along price axis and 36 and having corresponding heights relative to quantity axis 38. At step 104, buyer 12 enters an average buy price. As described above, display 30 may include window 46, which may be used for entering an average buy price. At step 106, the computer system calculates the quantity of items that may be bought at the entered average buy price under current market conditions. Any suitable combination of hardware and software supporting display 30 may calculate quantities and average prices. The computer system displays the calculated quantity of items within display 30 at step 108. As described above, the calculated quantity of items may be displayed within window 46 and, in addition or as an alternative, using quantity bar 48. The entered average buy price may also be displayed using average buy price bar 50.

At step 110, the computer system receives an instruction from buyer 12 to generate one or more bids for the calculated and displayed quantity at the entered average buy price for communication to market server 20. As described above, execution icon 52 may be used to provide such an instruction. For example, buyer 12 may select execution icon 52 to instruct the computer system to generate one or more bids for the calculated and displayed quantity at the entered average buy price and communicate the generated bids to market server 20 for matching with one or more appropriate asks. At step 112, the computer system generates one or more bids for the calculated and displayed quantity at the entered average buy price in response to receiving the instruction from buyer 12. As described above, the generated bids may include a number of different bids each including a different bid quantity and a different bid price. At step 114, the computer system communicates the generated bids to market server 20 for matching with one or more appropriate asks, and the method ends.

Figure 6:
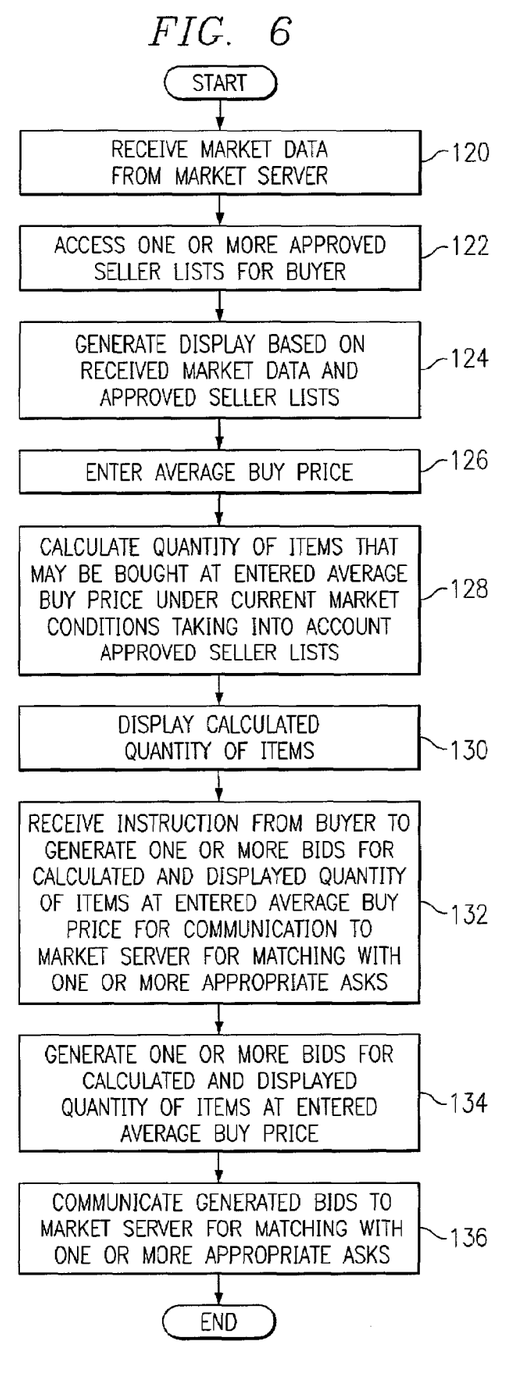
FIG. 6 illustrates an example method for generating another example display of market data and facilitating order entry.

FIG. 6 illustrates an example method for generating example display 60 and facilitating order entry. The method begins at step 120, where a computer system having one or more computers associated with a particular buyer 12 for generating display 60 receive market data from market server 20. The computer system accesses one or more approved seller lists for buyer 12 at step 122 and, at step 124, generates display 60 based on the received market data and approved seller lists. In another embodiment, as described above, market server 20 may locally generate all or certain portions of display 60 for a particular buyer 12 and communicate corresponding display data to a computer system associated with buyer 12 for the exclusive use of buyer 12. In yet another embodiment, market server 20 may locally generate certain portions of display 60 for use by any number of buyers 12 or sellers 14 and communicate corresponding display data to a computer system associated with a particular buyer 12, which computer system may modify display 60 (which may include incorporating one or more approved seller lists into the previously generated portions of display 60) for buyer 12.

As described above, display 60 may incorporate one or more approved seller lists and one or more approved buyer lists into a substantially real-time graphical representation of market conditions. Display 60 may include bid bars 32 and ask bars 34 placed along price axis 36 and having corresponding heights relative to quantity axis 38. Bid bars 32 within display 60 may each be divided into bid segments 62, each corresponding to a particular bid from a particular buyer 12. Bid quantity may be represented by the length of the corresponding bid segment 62, and buyer identity may be represented by the marking, shading, coloring, or other aspect of corresponding bid segment 62. Bids from buyers 12 excluded from one or more applicable approved buyer lists may be excluded from market display 60. As an alternative, bids from buyers 12 excluded from one or more applicable approved buyer lists may be included in market display 60, but distinctly marked, shaded, colored, or otherwise identified as being from an excluded buyer 12. Bids at a particular bid price may be prioritized according to any suitable prioritization scheme. For example, earlier-received bids at a particular bid price may be given higher priority than later-received bids at the same bid price, bid segments 62 within a particular bid bar 32 that correspond to higher-priority bids may be graphically placed on top of bid segments 62 within bid bar 32 that correspond to lower-priority bids, and higher-priority bids at a particular bid price may be matched with one or more asks before lower-priority bids at the same bid price are matched with one or more asks. As another example, bids from preferred buyers 12 at a particular bid price may be given higher priority than bids from other buyers 12 at the same bid price, which preferences may be indicated by one or more approved buyer lists for a particular seller 14, bid segments 62 within a particular bid bar 32 that correspond to higher-priority bids may be graphically placed on top of bid segments 62 within bid bar 32 that correspond to lower-priority bids, and higher-priority bids at a particular bid price may, using any suitable technique, be matched with asks from seller 14 before lower-priority bids at the same bid price are matched with asks from seller 14.

Similar to bid bars 32, ask bars 34 may also be divided into ask segments 64, each corresponding to a particular ask from a particular seller 14. Ask quantity may be represented by the length of corresponding ask segment 64, and seller identity may be represented by the marking, shading, coloring, or other aspect of corresponding ask segment 64. Asks from sellers 14 excluded from one or more applicable approved seller lists may be excluded from market display 60. As an alternative, asks from sellers 14 excluded from one or more applicable approved seller lists may be included in market display 60, but distinctly marked, shaded, colored, or otherwise identified as being from an excluded seller 14. Asks at a particular ask price may be prioritized according to any suitable prioritization scheme. For example, earlier-received asks at a particular ask price may be given higher priority than later-received asks at the same ask price, ask segments 64 within a particular ask bar 34 that correspond to higher-priority asks may be graphically placed on top of ask segments 64 within ask bar 34 that correspond to lower-priority asks, and higher-priority asks at a particular ask price may be matched with one or more bids before lower-priority asks at the same ask price are matched with one or more bids. Similar to bids at a particular bid price, asks at a particular ask price may be prioritized according to any suitable prioritization scheme. For example, earlier-received asks at a particular ask price may be given higher priority than later-received asks at the same ask price, ask segments 64 within a particular ask bar 34 that correspond to higher-priority asks may be graphically placed on top of ask segments 64 within ask bar 34 that correspond to lower-priority asks, and higher-priority asks at a particular ask price may be matched with one or more bids before lower-priority asks at the same ask price are matched with one or more bids. As another example, asks from preferred sellers 14 at a particular ask price may be given higher priority than asks from other sellers 14 at the same ask price, which preferences may be indicated by one or more approved seller lists for a particular buyer 12, ask segments 64 within a particular ask bar 34 that correspond to higher-priority asks may be graphically placed on top of ask segments 64 within ask bar 34 that correspond to lower-priority asks, and higher-priority asks at a particular ask price may, using any suitable technique, be matched with bids from buyer 12 before lower-priority asks at the same ask price are matched with bids from seller 14.

At step 126, buyer 12 enters an average buy price, and, at step 128, the computer system calculates the quantity of items that may be bought at the entered average buy price under current market conditions taking into account the approved seller lists. Any suitable combination of hardware and software supporting display 60 may calculate quantities and average prices. At step 130, the computer system displays the calculated quantity of items. As described above, display 60 may include one or more windows 46 for entering average buy (or sell) prices and displaying calculated quantities corresponding to entered average buy (or sell) prices. In addition or as an alternative, windows 46 may be used for entering quantities of items and displaying calculated average buy (or sell) prices corresponding to entered quantities. For example, display 60 may include window 46a for displaying calculated quantities and average buy (or sell) prices taking into account one or more approved seller (or buyer) lists. Display 60 may also include window 46b for displaying calculated quantities and average buy (or sell) prices not taking into account such lists, which may allow for a comparison of prices and quantities taking into account one or more approved seller (or buyer) lists with prices and quantities not taking into account such lists. Entered quantities and average buy (or sell) prices and calculated quantities and average buy (or sell) prices may, in addition or as an alternative to being displayed within window 46, be graphically displayed within display 60 using quantity bars 48 and average price bars 50, described above.

At step 132, the computer system receives an instruction from buyer 12 to generate one or more bids for the calculated and displayed quantity at the entered average buy price for communication to market server 20. As described above, execution icon 52 may be used to provide such an instruction. For example, buyer 12 may select execution icon 52 (which may be associated with window 46a) to instruct the computer system to generate one or more bids for the calculated and displayed quantity at the entered average buy price and communicate the generated bids to market server 20 for matching with one or more appropriate asks. At step 134, the computer system generates one or more bids for the calculated and displayed quantity at the entered average buy price in response to receiving the instruction from buyer 12. As described above, the generated bids may include a number of different bids each including a different bid quantity and a different bid price. At step 136, the computer system communicates the generated bids to market server 20 for matching with one or more appropriate asks, and the method ends.

Figure 7:
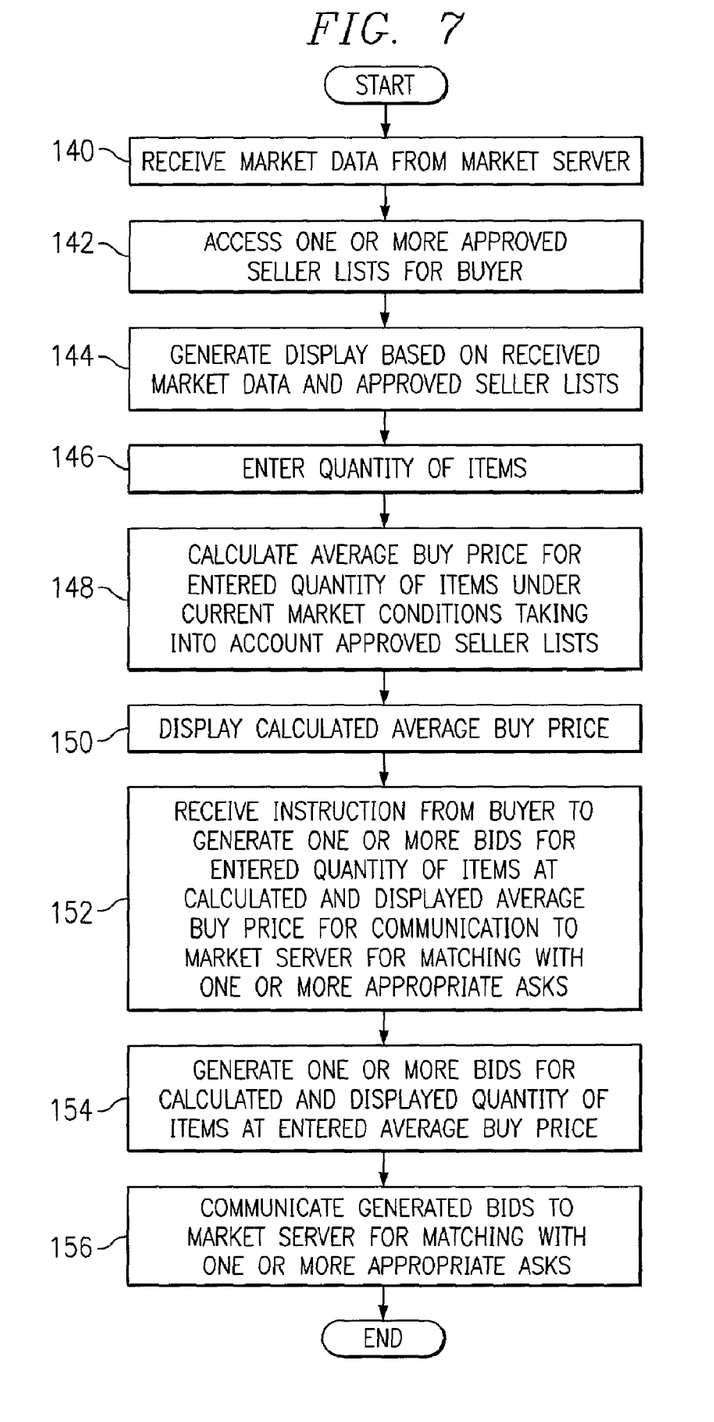
FIG. 7 illustrates an example method for generating another example display of market data and facilitating order entry.

FIG. 7 illustrates an example method for generating example display 70 and facilitating market entry. The method begins at step 140, where a computer system associated with a particular buyer 12 for generating display 70 receives market data from market server 20. The computer system accesses one or more approved seller lists for buyer 12 at step 142 and, at step 144, generate display 70 based on the received market data and approved seller lists. In another embodiment, as described above, market server 20 may locally generate all or certain portions of display 70 for a particular buyer 12 and communicate corresponding display data to a computer system associated with buyer 12 for the exclusive use of buyer 12. In yet another embodiment, market server 20 may locally generate certain portions of display 70 for use by any number of buyers 12 or sellers 14 and communicate corresponding display data to a computer system associated with a particular buyer 12, which computer system may modify display 60 (which may include incorporating one or more approved seller lists into the previously generated portions of display 70) for buyer 12.

As described above, display 70 may include one or more average buy price curves 72, which may each be a function of quantity and possibly one or more other variables. For example, average buy price curve 72a may include a plot of average buy price as a function of quantity, and average buy price curve 72b may include a plot of average buy price as a function of quantity and one or more approved seller lists for a buyer 12 using display 70. In general, average buy prices taking into account one or more approved seller lists for buyer 12 will be greater than average buy prices not taking into account such lists. Therefore, certain portions of price curve 72a may be separated from price curve 72b by area 74, which may represent the price difference between average buy prices taking into account one or more approved seller lists for buyer 12 and average buy price not taking into account such lists over a range of quantities.

At step 146, buyer 12 enters a quantity of items, and, at step 148, the computer system calculates the average buy price for the entered quantity of items under current market conditions taking into account one or more approved seller lists for buyer 12 and the average buy price for the entered quantity of items under current market conditions not taking into account such lists. Any suitable combination of hardware and software supporting display 70 may calculate quantities and average prices. The computer system display the calculated average buy prices at step 150. As described above, display 70 may include one or more windows 46, described above, for entering average buy prices and displaying calculated quantities corresponding to entered average buy prices. For example, window 46 within display 70 may include a quantity display and two average buy price displays, one for average buy prices corresponding to price curve 72a and one for average buy prices corresponding to price curve 72b. In addition or as an alternative, window 46 within display 70 may include an average buy price display and two quantity displays, one for quantities corresponding to price curve 72a and one for quantities corresponding to price curve 72b.

In addition or as an alternative to being displayed within window 46, entered and calculated quantities and entered and calculated average buy prices may be graphically displayed using one or more price curve intersection bars 76. The intersection of such a vertical price curve intersection bar 76 and buy price curve 72a may indicate that the entered quantity of items may be bought at one average buy price under current market conditions not taking into account one or more approved seller lists for buyer 12, and the intersection of the vertical price curve intersection bar 76 and buy price curve 72b may indicate that the eleven hundred items may be bought at another, generally higher, average buy price under current market conditions taking into account such lists. As another example, buyer 12 may enter an average buy price and a price curve intersection bar 76 may be generated and horizontally placed along price axis 80 according to the entered average buy price. The intersection of such a horizontal price curve intersection bar 76 and buy price curve 72*a* may indicate that one quantity of items may be bought at the entered average buy price under current market conditions not taking into account one or more approved seller lists for buyer 12, and the intersection of the horizontal price curve intersection bar 76 and buy price curve 72*b* may indicate that another, generally smaller, quantity of items may be bought at the entered average buy price under current market conditions not taking into account such lists. Although example price curve intersection bars 76 are described and illustrated herein, the present invention contemplates any suitable bars or other graphical representations of calculated and entered quantities and calculated and entered average prices being included within display 70.

At step 152, the computer system receives an instruction from buyer 12 to generate one or more bids for the entered quantity at the calculated and displayed average buy price taking into account one or more approved seller lists for buyer 12 and for communication to market server 20. As described above, execution icon 52 may be used to provide such an instruction. For example, buyer 12 may select execution icon 52 to instruct the computer system to generate one or more bids for the entered quantity at the calculated and displayed average buy price and communicate the generated bids to market server 20 for matching with one or more appropriate asks. Although execution icon 52 has been particularly described herein as being used to automatically generate one or more bids based on current market conditions taking into account one or more approved seller lists for buyer 12, the present invention contemplates execution icon 52 being used to automatically generate one or more bids based on any suitable information displayed within window 46 or elsewhere within display 70. For example, execution icon 52 may be used to automatically generate one or more bids based on current market conditions not taking into account one or more approved seller lists for buyer 12. At step 154, the computer system generates one or more bids for the calculated and displayed quantity at the entered average buy price in response to receiving the instruction from buyer 12. As described above, the generated bids may include a number of different bids each including a different bid quantity and a different bid price. At step 156, the computer system communicates the generated bids to market server 20 for matching with one or more appropriate asks, and the method ends.

Although the present invention has been described with several embodiments, divers changes, substitutions, variations, alterations, and modifications may be suggested to one skilled in the art, and it is intended that the invention may encompass all such changes, substitutions, variations, alterations, and modifications fall within the spirit and scope of the appended claims.

What is claimed is:

1. A computer-implemented method for generating a display of at least one side of a market, the method comprising:
   receiving, by a computer, market data representing one or more offers, from one or more market participant computers, each offer comprising an offered price and an offered quantity;
   generating, by the computer, a display of the received market data, the display comprising a price axis, a quantity axis, a first price curve comprising a plot of average offered price as a function of quantity, and a second price curve comprising a plot of average offered price as a function of quantity and an approved market participant list for a user;
   accessing, by the computer, a quantity specified by the user;
   calculating, by the computer, a first average offered price comprising a price at which the specified quantity is available independent of the approved market participant list;
   calculating, by the computer, a second average offered price comprising a price at which the specified quantity is available taking into account the approved market participant list; and
   indicating, by the computer, the first and second calculated average offered prices within the display of the received market data.

2. The method of claim 1, wherein the indication of the first and second calculated average offered prices comprises a line placed along the quantity axis at the specified quantity, the line intersecting the first price curve at the first calculated average offered price, the line intersecting the second price curve at the second calculated average offered price.

3. The method of claim 1, wherein the offers comprise asks.

4. The method of claim 1, wherein the market participant computers comprise seller computers.

5. The method of claim 1, wherein offered prices comprise ask prices.

6. The method of claim 1, wherein offered quantities comprise ask quantities.

7. The method of claim 1, wherein the approved market participant list comprises an approved seller list.

8. The method of claim 1, wherein the calculated first and second average offered prices each comprise an average buy price at which the specified quantity is available.

9. The method of claim 1, further comprising:
   accessing an average price specified by the user;
   calculating a first offered quantity and a second offered quantity, the first calculated offered quantity comprising a quantity available at the specified average price independent of the approved market participant list, the second calculated offered quantity comprising a quantity available at the specified average price taking into account the approved market participant list, the first calculated offered quantity is greater than or equal to the second calculated offered quantity; and
   indicating the first and second calculated offered quantities within the display of the received market data.

10. The method of claim 1, further comprising:
    receiving new market data representing one or more changes in the one or more offers; and
    in response to receiving the new market data, updating the display of the market data.

11. A computer-implemented method for generating a display of at least one side of a market, the method comprising:
    receiving, by a computer, market data representing one or more asks, from one or more seller computers, each ask comprising an ask price and an ask quantity;
    generating, by the computer, a display of the received market data, the display comprising a price axis, a quantity axis, and one or more ask bars, each ask bar representing one or more asks comprising substantially equal ask prices, placement of an ask bar along the price axis representing the substantially equal ask prices for the one or more asks represented by the ask bar, height of an ask bar relative to the quantity axis representing an aggregate ask quantity for the one or more asks represented by the ask bar;
    accessing, by the computer, an average buy price specified by a user;

calculating, by the computer, a quantity available at the average buy price based on the received market data; and indicating the specified average buy price within the display of the received market data.

12. The method of claim 11, wherein the indication of the specified average buy price comprising a line placed along the price axis at the specified average price.

13. The method of claim 11, further comprising:

indicating the calculated quantity within the display of the received market data, the indication of the calculated quantity comprising a line placed along the quantity axis at the calculated offered quantity.

14. The method of claim 11, further comprising:

accessing a quantity specified by the user;

calculating an average buy price at which the specified quantity is available based on the market data; and indicating the specified quantity within the display of the received market data, the indication of the specified quantity comprising a line placed along the quantity axis at the specified quantity.

15. The method of claim 14, further comprising:

indicating the calculated average buy price within the display of the received market data, the indication of the calculated average buy price comprising a line placed along the price axis at the calculated average buy price.

16. The method of claim 11, further comprising:

receiving new market data representing one or more changes in the one or more asks; and in response to receiving the new market data, updating the display of the market data.

17. A computer-implemented method for generating a display of at least one side of a market, the method comprising:

receiving, by a computer, market data reflecting one or more offers, from one or more market participant computers, each offer comprising an offered price and an offered quantity;

generating, by the computer, a display of the received market data, the display comprising a price axis, a quantity axis, and one or more offer bars, each offer bar representing one or more offers comprising substantially equal offered prices, placement of an offer bar along the price axis representing the substantially equal offered prices for one or more offers represented by the offer bar, height of an offer bar relative to the quantity axis representing an aggregate offered quantity for the one or more offers represented by the offer bar;

accessing, by the computer, an average price specified by a user;

calculating, by the computer, an offered quantity available at the specified average offered price based on the received market data; and indicating the computer, the calculated offered quantity within the display of the received market data.

* * * * *